Aug. 20, 1929.  E. C. RIKLIN  1,725,303
LUBRICATING MEANS FOR BEARINGS
Filed Dec. 1, 1926

INVENTOR.
Edward C. Riklin
by Parker & Prochnow
ATTORNEYS.

Patented Aug. 20, 1929.

1,725,303

UNITED STATES PATENT OFFICE.

EDWARD C. RIKLIN, OF TONAWANDA, NEW YORK, ASSIGNOR TO BUFFALO STEAM PUMP COMPANY, OF BUFFALO, NEW YORK.

LUBRICATING MEANS FOR BEARINGS.

Application filed December 1, 1926. Serial No. 151,928.

This invention relates to lubricating means for bearings, and more particularly for vertical bearings in which the lubricant is moved, during the rotation of a member in the bearing, from a lower reservoir to an upper reservoir and finds its way back through the bearing from the upper reservoir to the lower one.

The objects of this invention are to provide lubricating means of this kind in which the greater part of the lubricant is stored in reservoirs or pans in which the lubricant is kept out of contact with the bearing surfaces to prevent excessive heating of the lubricant; also to provide a pump or propelling device of improved construction for raising the lubricant from the lower reservoir to an upper one, which operates automatically when the revolving part turns in its bearing; also to provide a lubricating device of this kind which is so constructed that no excess lubricant can be supplied either to the upper or lower reservoirs so that the throwing of oil by the bearing is prevented; also to provide lubricating means of this kind in which only a predetermined quantity of lubricant is supplied from the upper reservoir or pan to the bearing; also to improve the construction of lubricating devices of this kind in other respects hereinafter specified.

In the accompanying drawings.

Figure 1:
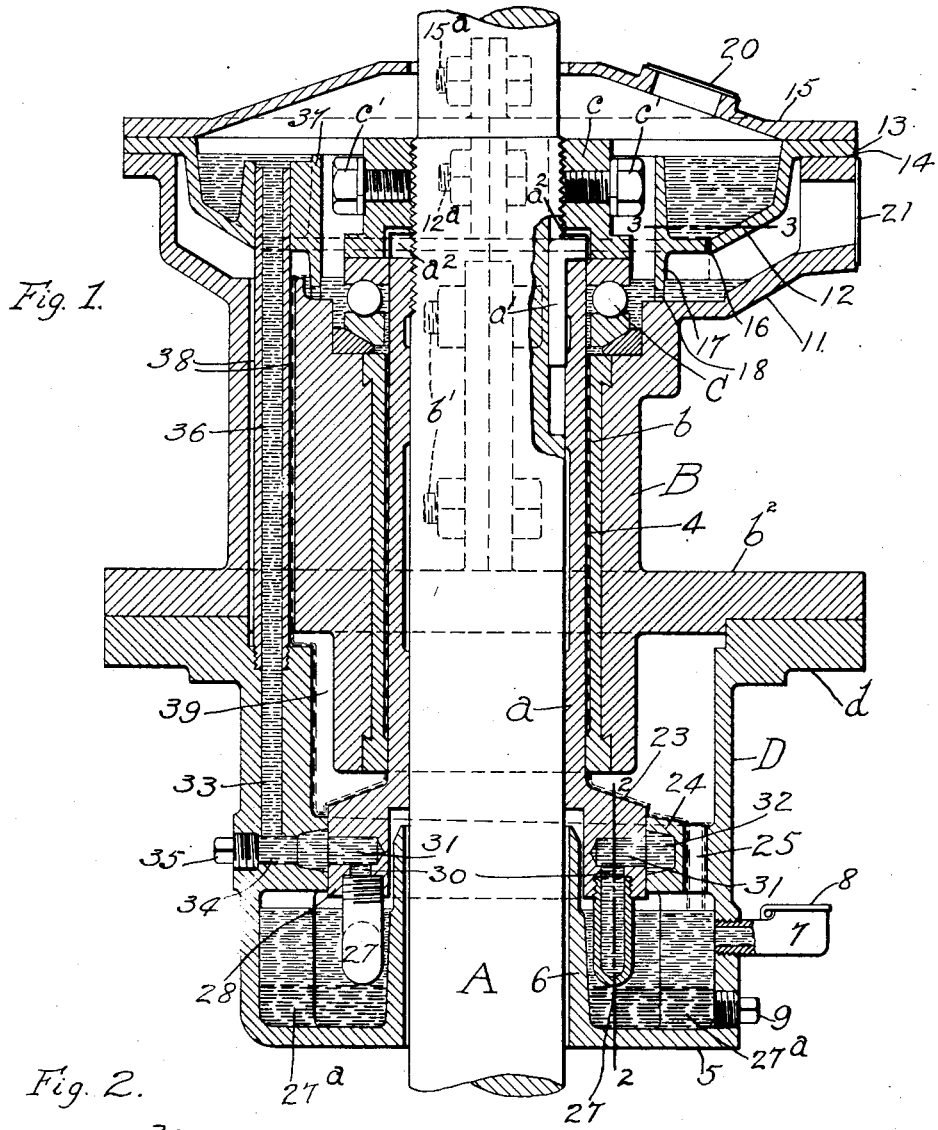
Fig. 1 is a central, sectional elevation of a bearing provided with lubricating means embodying my invention.
Figure 2:
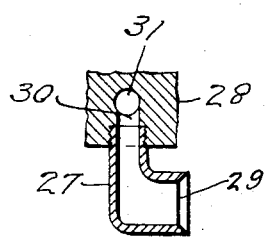
Fig. 2 is a fragmentary, sectional elevation thereof on line 2—2, Fig. 1.

My improved lubricating means may be used in connection with any desired type of upright or vertical bearing, that shown in the drawings being merely for purposes of illustration and includes a combined thrust and vertical guide bearing. It will be understood, however, that the thrust bearing may be of different construction or entirely omitted and any other type of vertical bearing may be used in place of the guide bearing shown. The particular bearing illustrated cooperates with a vertical shaft A having a sleeve $a$ rigidly secured thereto, for example, by a jib key $a'$ fitting in a keyway in the shaft and the top of which fits into any one of a plurality of slots $a^2$ in the top of the sleeve $a$. B represents the bearing which may be made in two halves secured together in the usual manner by bolts $b'$ shown in broken lines in Fig. 1 and has an inner bushing or bearing sleeve $b$ within which the sleeve $a$ secured to the shaft A bears. The bearing bushing $b$ may be provided on its inner face with the usual grooves 4, which receive the lubricant at their upper ends and which terminate at their lower ends above the lower end of the bushing $b$.

The bearing B is provided near its upper portion with an inner annular shoulder supporting a thrust bearing C, and a thrust nut or collar $c$ is connected with the shaft A, for example, by means of a screw threaded engagement as shown, and transmits the downward thrust of the shaft A to the thrust bearing C, suitable set screws $c'$ being provided for locking the thrust sleeve or nut $c$ in its correct position.

The bearing may be provided with an annular outwardly extending flange $b^2$, to the lower face of which is secured an outwardly extending flange $d$ of a lower reservoir or pan D for the lubricant or oil. This reservoir or pan has a lower wall 5 and an upwardly extending inner annular wall 6 arranged in close proximity to, but out of contact with the shaft A. This annular wall 6 together with the outer wall of the pan or reservoir and the lower wall 5, form an annular receptacle in which the lubricant is contained. A filling cup or oil inlet 7 is secured to the outer wall of the pan or reservoir and communicates with the interior thereof, the top of the filling cup being arranged at the level of the lubricant desired in the lower pan or reservoir so that no more than the required amount of lubricant may be supplied to the lower reservoir or tank. 8 represents a cover for closing the filling cup and 9 represents a plug by means of which the oil may be drained from the lower reservoir. The lower reservoir or pan D for the lubricant may be of any other suitable or desired construction.

Figure 3:
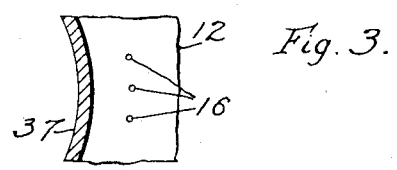
Fig. 3 is a fragmentary plan view thereof on line 3—3, Fig. 1.

The upper reservoir or pan for the lubricant may be of any suitable or desired construction, that shown in the drawing being constructed as follows:—The upper part of the bearing B flares outwardly as shown at 11 to form a reservoir for the lubricant, and if desired a second upper reservoir 12 may be arranged within the enlarged portion 11 of the bearing, this second upper reservoir having an outwardly extending flange 13 adapted to seat on a flange 14 formed at the outer edge or top of the outwardly extending part 11 of the bearing, and a cover 15 for the bearing may also have its outer edge secured to these flanges. The reservoir 12 and cover 15 are preferably also made in two halves secured together by bolts 12$^a$ and 15$^a$ shown in broken lines in Fig. 1. The second upper reservoir 12 may communicate with the other reservoir 11 in any suitable manner, for example, by means of a series of holes 16, Figs. 1 and 3, through which the lubricant drips into the reservoir 11. The second upper reservoir 12 may also be provided with a downwardly extending flange or base 17 which rests on a part of the reservoir 11 and which is provided with openings or recesses 18 extending upwardly from the lower edge thereof and through which the lubricant may flow from the reservoir 11 to the bearings. This flange practically divides the reservoir 11 into two annular parts and serves to keep the lubricant in the outer part of this reservoir out of contact with the relatively movable contacting parts of the bearing and thus helps to keep the lubricant cool. The cover 15 may be provided with a peep hole 20 through which a part of the reservoir 12 may be seen and another peep hole 21 may be provided in the reservoir 11 through which the drip from the upper reservoir 12 into the reservoir 11 may be observed.

The uppermost reservoir 12 may be eliminated, in which case the lubricant could be fed directly to the reservoir formed by the outwardly extending portion 11 of the bearing. It will be obvious from the construction described that the lubricant entering into the outwardly extending portion 11 of the bearing finds its way to the thrust bearing C, if one is used, and then between the bearing lining or bushing $b$ and the sleeve $a$ on the shaft A, and when the lubricant has passed to the bottom of the upright bearing, it is returned to the lower reservoir or pan D. In order to insure that the lubricant shall enter into the lower pan or reservoir and not drip along the shaft A, the sleeve $a$ secured on this shaft is preferably provided near its lower end with an outwardly flaring portion 23, along the upper edge of which the lubricant flows outwardly upon an inwardly extending flange 24, which is preferably formed integral with the lower pan or reservoir D and thence through apertures 25 in this flange into the lower reservoir or pan.

The pumping or transmitting of the lubricant from the lower reservoir or pan to the upper one is preferably accomplished by means of one or more scoops or lubricant receivers 27, two being shown in the construction illustrated, which rotate with the shaft A. In the construction illustrated these scoops are secured to the lower edge of a downwardly extending flange 28 of the sleeve $a$, which flange, in the particular construction shown in the drawings, is formed integral with the outwardly flaring portions 23 of the sleeve $a$. These scoops are hollow or tubular and of L shape and their lower open ends 29 face the direction of rotation of the shaft A and travel through the lubricant or oil in the lower reservoir or pan, so that the oil is scooped up and carried upwardly in the scoops through upright passages 30 in the flange 28, each of which connect with an outwardly extending aperture 31 in the flange 28, each aperture terminating in the outer face of the flange. The inwardly extending flange 24 of the oil pan or receptacle D is provided in its inner face with an annular groove or recess 32 with which the open ends of the outwardly extending apertures 31 communicate. This groove or recess 32 communicates with an upright passage 33 in the lower reservoir or pan D through a short connecting passage 34, the outer end of which is closed by a plug 35. The passage 33 communicates with a tube or passage 36 leading to the upper reservoir or pan. Any suitable means may be provided to oppose the rotation of the lubricant in the lower reservoir due to the rotation of the scoops, baffles 27$^a$ being provided in the lower reservoir in the construction shown which extend inwardly from the outer wall of this reservoir.

The lubricant propelling device described operates as follows:—The rapid movement of the scoops 27 causes the lubricant to be forced into the open ends 29 of the scoops and to flow through the scoops to the outwardly extending apertures 31 in the flange 28 which rotates with the shaft, rotation of the lubricant being prevented by the baffles 27$^a$. The upward movement imparted to the lubricant by the movement of the scoops in the lower lubricant reservoir is then accelerated by the centrifugal action in the outwardly extending passages 31 by means of which the lubricant is forced into the annular groove or recess 32 from which it finds its way through the upwardly extending passage 33 and 36 to the upper reservoir 12. Consequently movement is imparted to the lubricant both by the action of the scoops passing through the body of lubricant in the lower reservoir and by the centrifugal action of the outwardly extending passages 31. Also it is only necessary for the scoops to raise the lubricant into the tubes 31, whereupon the centrifugal action will complete the raising of the lubricant into the upper reservoir. It will be noted also that the scoops 27 do not extend to the bottom of the reservoir or pan D but terminate at a distance above the bottom. Consequently any dirt or sediment in the lubricant will settle and remain in the lower part of the reservoir or pan D and will not be returned to the bearing. The quantity of lubricant contained in the lower pan or reservoir D above the lower edges of the scoops 27 is approximately sufficient to fill the upper reservoir or reservoirs and consequently after this quantity of lubricant has been pumped into the upper reservoir or reservoirs, no more lubricant can be forced upwardly by these scoops until some of the lubricant has passed through the bearing and back to the lower pan or reservoir.

In case it is desired to use two upper reservoirs or pans, the upper end of the tube 36 terminates in the upper reservoir 12. The upper reservoir 12 is provided with an inner wall 37 which is lower than the outer wall or flange of this annular reservoir and which therefore determines the upper level of liquid in this reservoir. When more lubricant is supplied to this reservoir, it overflows into the other reservoir or pan 11, which is also provided with an overflow passage 38 through which excessive lubricant can return to the lower reservoir D. In the construction shown this passage 38 is formed in the bearing member B and the upflow pipe 36 extends upwardly in this passage 38. At its lower end the passage 38 terminates in a communicating passage 39 formed in the lower receptacle D so that the overflow passes upon the flange 23 and thence through the apertures 24 into the bottom portion of the lower reservoir.

In the operation of the lubricating means, when the rotation of the shaft commences, the lower reservoir will be filled with lubricant up to the level 40 indicated by the lighter shading and the upper reservoir 12 will be empty. When the shaft attains some speed, the scoops or receivers will scoop up lubricant and this scooping action together with the centrifugal force applied to the lubricant by the radial passages 31 forces the lubricant into the upper reservoir 12, from which the lubricant drips through the holes 16 into the reservoir 11. The holes 16 are so proportioned that they will supply the correct amount of lubricant to the bearing or bearings. In case the lubricant is not discharged from the reservoir 11 through the bearing as rapidly as it drips through the apertures 16, the excess lubricant is discharged through the overflow passage 38 to the lower reservoir.

It will be noted that both the lower reservoir or pan D and the upper reservoir 12 are entirely out of contact with the bearing or with the shaft A. Furthermore the downwardly extending flange or base 17 separates the lubricant in the reservoir 11 into two portions, one in contact with the thrust bearing C and another out of contact therewith, so that only a small quantity of the lubricant is actually in contact with the bearing surfaces. consequently very little heat from the bearing is imparted to the lubricant. Furthermore only a limited quantity of lubricant remains at any time in the reservoir 11, since any excess lubricant which may enter this reservoir is discharged through the overflow passage to the lower reservoir, so that overheating of the lubricant is effectively prevented. The propelling device described is very efficient for the reason that after the lubricant in the lower reservoir has been pumped out to the level of the bottoms of the scoops or receivers 27, these receivers will revolve in an air space and thus offer practically no resistance to movement.

I claim as my invention:—

1. Lubricating means for an upright bearing for a rotary member, including a lower stationary reservoir adapted to contain a certain amount of lubricant and adapted to receive lubricant which has passed through said bearing, an upper reservoir from which lubricant is supplied to said bearing, means for pumping lubricant from said lower reservoir to the upper reservoir, said means including scoops mounted on said rotary member and having openings facing the direction of movement of the scoops and dipping into the lubricant in said lower reservoir to propel the lubricant upwardly and passages connecting said scoops with the upper reservoir, and means in said lower reservoir to oppose rotation of the lubricant therein by said scoops.

2. Lubricating means for an upright bearing for a rotary member, including a lower stationary lubricant reservoir adapted to receive lubricant which has passed through said bearing, an upper reservoir from which lubricant is supplied to said bearing, a tubular scoop mounted on said rotary member and having an open end facing the direction of movement of said scoop and extending into the lubricant in said lower reservoir, baffles in said lower reservoir to oppose rotation of the lubricant therein by said scoops, and a passage for conducting lubricant from said scoop to said upper reservoir.

3. Lubricating means for an upright bearing for a rotary member, including stationary reservoirs arranged above and below the bearing, the upper reservoir being adapted to supply lubricant to the bearing and the lower reservoir being adapted to receive lubricant discharged from the bearing, an annular wall separating said upper reservoir into an inner and an outer annular part, the lubricant in said inner part being in contact with moving parts of said bearing, and means for supplying lubricant from said lower reservoir to said outer part of said upper reservoir.

4. Lubricating means for an upright bearing for a rotary member, including stationary reservoirs arranged above and below the bearing, the upper reservoir being adapted to supply lubricant to the bearing and the lower reservoir being adapted to receive lubricant discharged from the bearing and being arranged out of contact with moving parts of said bearing, an annular wall separating said upper reservoir into an inner and an outer annular part, the lubricant in said inner part being in contact with moving parts of said bearing, and means for supplying lubricant from said lower reservoir to said outer part of said upper reservoir.

5. A bearing device for an upright rotary member comprising a bearing element surrounding and providing a bearing surface for said member, said element having a chamber at its upper end surrounding and spaced from said member, said member having a shoulder in said chamber with a thrust bearing against the bottom of said chamber, said element having a reservoir at its lower end for receiving lubricant discharged from said bearing, said chamber being divided into an inner section surrounding said thrust bearing, and an outer annular section having a restricted communication with said inner annular section, means operated with said rotary member for elevating said lubricant from said reservoir and discharging it into said outer section, whereby a considerable portion of the lubricant in said chamber will be out of contact with the parts to be lubricated, and will be fed to said inner section as required.

6. A lubricating device for an upright rotary member comprising a bearing element surrounding and providing a bearing surface for said member, the upper end of said element having a chamber surrounding said member, said rotary member and the upper end of said element having a thrust bearing arrangement between them in said chamber, a partition in said chamber dividing it into an inner annular section surrounding said thrust bearing, and an outer section, said partition having a restricted passage permitting restricted flow of lubricant from the outer section to the inner section, said element having at its lower end a reservoir for receiving lubricant discharged from the bearing surface, and means operated by said rotary member for elevating lubricant from said reservoir to the outer annular section of said chamber.

7. A lubricating device for an upright rotary member comprising a bearing element surrounding and providing a bearing surface for said member, the upper end of said element having a chamber surrounding said member, said rotary member and the upper end of said element having a thrust bearing arrangement between them in said chamber, a partition in said chamber dividing it into an inner annular section surrounding said thrust bearing, and an outer section, said partition having a restricted passage permitting restricted flow of lubricant from the outer section to the inner section, said element having at its lower end a reservoir for receiving lubricant discharged from the bearing surface, a container in said upper chamber and having a restricted opening in its bottom wall permitting restricted flow of its contents to the outer section of said chamber, and directing any overflow into the inner section of said chamber, and means operated by said rotary member for elevating lubricant from said reservoir to the container in said chamber, said element having an overflow connection between the inner section of said chamber and said lubricant reservoir.

8. A lubricating device for an upright rotary member comprising a bearing element surrounding said member, said element having a chamber in its upper end through which said member extends, a collar secured to said member within said chamber and having a thrust bearing with the bottom of said chamber, a sleeve surrounding said rotary member and having rotatable bearing in said element, the lower end of said sleeve flaring outwardly in spaced relation to said member, the lower end of said element forming a reservoir into which the lower flaring end of said sleeve depends, the bottom wall of said reservoir having a wall projecting upwardly as a flange and surrounding and spaced from said rotary member and within said flared lower end of said sleeve, means for elevating a lubricant from said lower reservoir to said chamber, including collecting and elevating parts carried by the lower flared end of said sleeve, and an overflow from said chamber to said lower reservoir preventing rise of the level of lubricant in the portion of said chamber surrounding said thrust bearing above the upper end of said sleeve.

9. A lubricating device for an upright rotary member comprising a bearing element surrounding and providing a bearing surface for said member, the upper end of said element having a chamber surrounding said member, said rotary member and the upper end of said element having a thrust bearing arrangement between them in said chamber, an annular pan having an outer peripheral flange resting upon the upper end of said bearing element at the outer edge of said chamber, the bottom of said pan having a flange depending into close proximity to the bottom of said chamber for dividing said chamber into inner and outer sections, and restricting flow between said inner and outer sections, said pan having means for discharging its contents slowly into the outer of said sections, the lower end of said element having a chamber forming a lubricant reservoir for receiving lubricant discharged at the lower end of said bearing surface, an overflow connection between one of said sections and said reservoir, and means operated by said rotary member for elevating lubricant from said reservoir to said pan.

10. A lubricating device for an upright rotary member comprising a bearing element surrounding and providing a bearing surface for said member, the upper end of said element having a chamber surrounding said member, said rotary member and the upper end of said element having a thrust bearing arrangement between them in said chamber, an annular pan having an outer peripheral flange resting upon the upper end of said bearing element at the outer edge of said chamber, the bottom of said pan having a flange depending into close proximity to the bottom of said chamber for dividing said chamber into inner and outer sections, and restricting flow between said inner and outer sections, said pan having means for discharging its contents slowly into the outer of said sections, the lower end of said element having a chamber forming a lubricant reservoir for receiving lubricant discharged at the lower end of said bearing surface, an overflow connection between one of said sections and said reservoir, and means operated by said rotary member for elevating lubricant from said reservoir to said pan, the inner wall of said pan permitting overflow into said inner section prior to any overflow over the outer wall of said pan.

11. A bearing device for an upright rotary member comprising a bearing element surrounding and providing a bearing surface for said member, said element having a chamber at each end of the bearing surface, said element having a horizontal flange in its lower chamber extending into close proximity to the outer periphery of said member at a point spaced below the lower end of said bearing surface, said flange having a groove in its edge abutting said member, a conduit connecting said groove with said upper chamber, said member having a passage opening outwardly in the peripheral portion covered by said flange and thereby communicating with said groove, and also having means for raising lubricant from the portion of said lower chamber below said flange and by rotation of said member forcing the lubricant through said passage under pressure into said groove, said upper chamber being formed to feed a lubricant discharged therein from said conduit, against the upper end of said surface, said flange being apertured from face to face separately from said conduit to conduct into the lower end of the lower chamber all lubricant descending along said surface and all lubricant escaping upwardly between said flange and member, whereby said lubricant may flow freely along said surface from the upper to the lower chamber.

EDWARD C. RIKLIN.